USO05700949A

United States Patent [19]

Baney

[11] Patent Number: 5,700,949
[45] Date of Patent: Dec. 23, 1997

[54] OPTICAL RECEIVER CALIBRATION BASED ON A RELATIVE INTENSITY NOISE STANDARD

[75] Inventor: Douglas M. Baney, Los Altos, Calif.

[73] Assignee: Hewlett-Packard Company, Palo Alto, Calif.

[21] Appl. No.: 694,962

[22] Filed: Aug. 9, 1996

[51] Int. Cl.[6] ................................................. G01N 21/00
[52] U.S. Cl. ................................. 73/1 R; 250/252.1 A; 356/243
[58] Field of Search ................... 250/252.1 R, 252.1 A; 356/243, 46; 73/1 R

[56] References Cited

U.S. PATENT DOCUMENTS 4,921,347  5/1990  Wong et al. .......................... 356/243
5,561,290  10/1996  Strobel et al. ...................... 250/251.1

OTHER PUBLICATIONS

"Broadband Frequency Characterization of Optical Receivers Using Intensity Noise"; Hewlett–Packard Journal, Feb. 1995, pp. 6–12.
"High–Frequency Photodiode Characterization Using A Filtered Intensity Noise Technique"; IEEE Photonics Technology Letters, vol. 6, No. 10, Oct. 1994, pp. 1258–1260.
"Erbium–Doped Fiber Amplifiers Use In Optical Fiber Communications"; JEE, Apr. 1994, Hiroshi Arimoto.
"Wide–bandwith Receiver/Photodetector Frequency Response Measurements Using Amplified Spontaneous Emission From A Semiconductor Optical Amplifier"; Elliot Eichen, John Schlafer, William Rideout, John McCabe; J. Lightwave Technol., vol. 8, No. 6, pp. 912–916, 1990.
"Relative Intensity Noise In Semiconductor Optical Amplifier", William Rideout, Elliot Eichen, John Schlafer, Joanne Lacourse, Ed Meland; IEEE Photon. Technol. Lett., vol. 1, No. 12, pp. 438–440, 1989.

*Primary Examiner*—Robert Raevis
*Attorney, Agent, or Firm*—John L. Imperato

[57] ABSTRACT

A relative intensity noise (RIN) standard provides a reference optical noise signal used to characterize the relative frequency response and calibrate the absolute level of an optical receiver. The RIN standard includes an optical filter, illuminated by a high power optical noise source, or alternatively, the RIN standard includes a coherent laser signal combined with amplified spontaneous emission from a variety of gain media. The RIN standard is characterized and marked with a specific RIN value and is readily transported between measurement sites, providing a portable standard for optical receiver calibration. The reference optical noise signal is applied to the optical receiver to characterize the receiver's transfer function. Once the transfer function of the optical receiver is characterized and the receiver is calibrated using the RIN standard, optical noise figure and other performance parameters of high bandwidth optical components are readily measured.

18 Claims, 1 Drawing Sheet

OPTICAL RECEIVER CALIBRATION BASED ON A RELATIVE INTENSITY NOISE STANDARD

FIELD OF THE INVENTION

The present invention relates to optical instrumentation and, more particularly, to a system for calibrating an optical receiver based on a reference optical noise signal provided by a relative intensity noise standard.

BACKGROUND OF THE INVENTION

Optical communication systems, due to their high bandwidths and high information throughput, are critical to the development of the information superhighway. High bandwidth optical components, such as erbium-doped fiber amplifiers, used in the systems have been developed so rapidly that they have out-paced the instrumentation available for characterizing their performance. Noise figure and other performance parameters of optical components are important to characterize because they impact the integrity of optical communication systems. However, noise figure measurement relies upon calibrating an optical receiver which is difficult because the calibration relies on stimulating the receiver with precisely controlled signals to characterize photodetectors, preamplifiers, electrical spectrum analyzers and other linear and nonlinear elements within the receiver.

A known system for calibrating an optical receiver heterodynes a pair of temperature and polarization controlled lasers to trace out the relative frequency response of the receiver. Then, a beat signal applied to the receiver provides absolute level calibration. The heterodyne system accurately calibrates the receiver, but it depends upon carefully controlled tunable sources and involves a complex optical setup, making this type of calibration system impractical to transport to different measurement sites. Another known system uses an optical signal modulated at a known frequency and modulation index and applies the modulated optical signal to the optical receiver to be calibrated. The modulated optical signal provides for accurate calibration at the frequency of the applied signal, but the calibration is discontinuous, causing calibration of the receiver's frequency response to be time consuming. In addition, nonlinear elements in the optical receiver, such as logarithmic amplifiers and detectors, respond differently to sinusoidal signals and noise signals. Thus, the calibration of an optical receiver using a sinusoidal signal may not be a valid calibration for noise signals.

Baney et. al. in IEEE Photonics Technology Letters, Vol. 6, No. 10, Oct. 1994 describe a filtered intensity noise technique for characterizing the relative frequency response of an optical receiver. The optical receiver is stimulated with broadband optical noise at all frequencies simultaneously, within a predefined optical bandwidth. The filtered intensity noise technique provides continuous, broadband characterization of the relative frequency response of the optical receiver using a simple optical measurement setup. However, the technique does not provide for absolute level calibration of the receiver. Characterization of the relative frequency response and an absolute level calibration are relied upon for complete calibration of the optical receiver to enable measurement of noise figure and other performance parameters of high bandwidth optical components.

SUMMARY OF THE INVENTION

In accordance with the preferred embodiment of the present invention, a calibration system characterizes the relative frequency response and calibrates the absolute level of an optical receiver. A reference optical noise signal applied to the optical receiver is used to characterize the receiver's transfer function. Once the transfer function of the optical receiver is known, the output of the optical receiver is corrected according to the established transfer function to calibrate the receiver's frequency response and absolute level. A relative intensity noise (RIN) standard provides the reference optical noise signal and is portable and readily transferable to various measurement sites. The RIN standard includes an optical filter that is illuminated by a high power optical noise source, such as amplified spontaneous emission (ASE) from a fiber optic amplifier, or alternatively, the RIN standard includes a coherent laser source combined with ASE available from a variety of gain media. The RIN standard is characterized and marked with a specific RIN value that is computed from the spectral shape and average power of the reference optical noise signal. The transfer function of the optical receiver is then determined using the RIN value of the RIN standard. The RIN value is traceable to measurement standards, providing traceable calibration of the relative frequency response and absolute level of the optical receiver. The RIN value of the RIN standard is readily verified to ensure accurate calibration of the optical receiver. The calibrated optical receiver enables noise figure and other performance parameters of high bandwidth optical components to be measured using known techniques.

DETAILED DESCRIPTION OF THE PREFERRED EMBODIMENT

Figure 1:
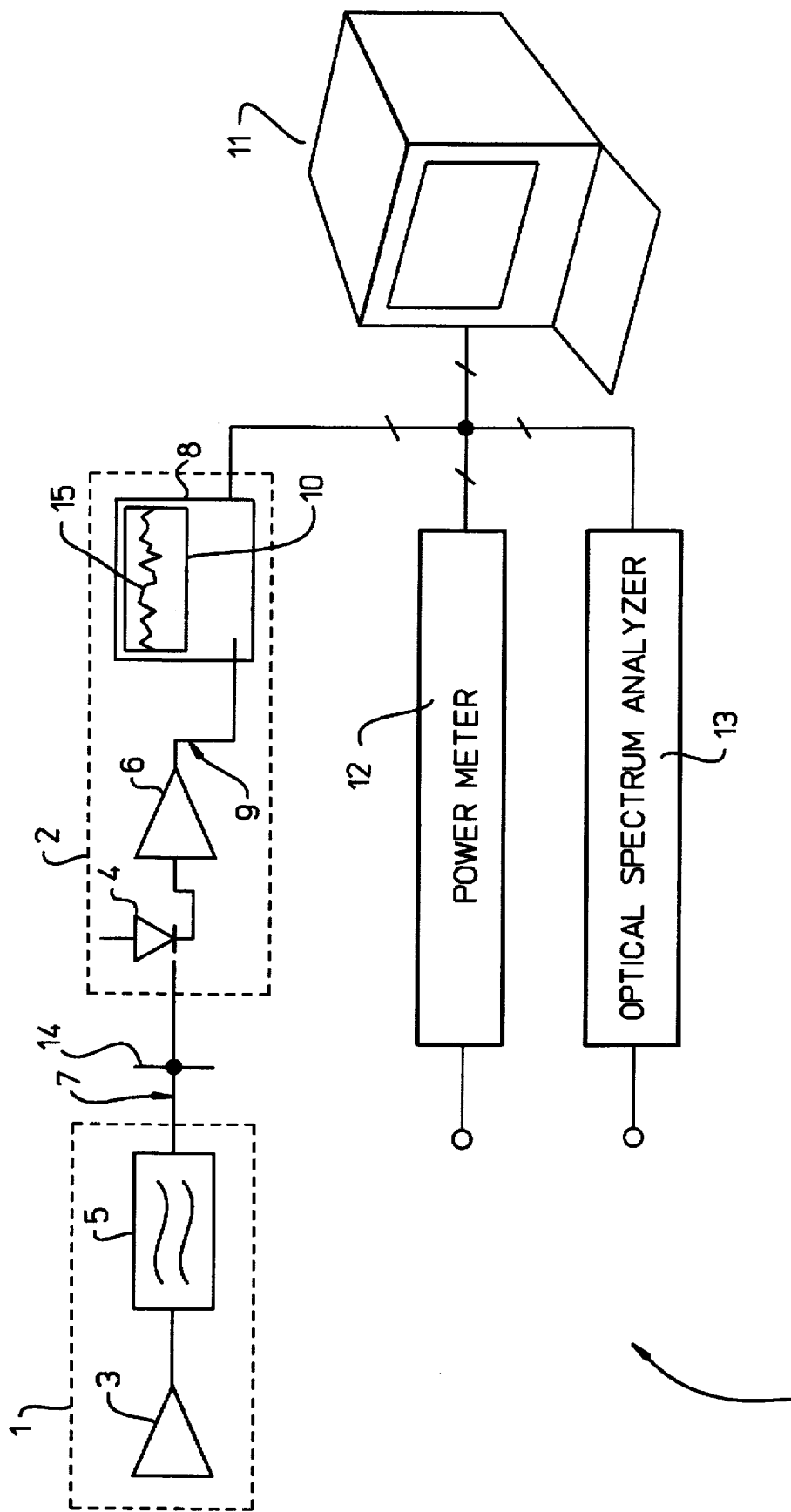
FIG. 1 shows a calibration system for an optical receiver, including a RIN standard, constructed in accordance with the preferred embodiment of the present invention.

FIG. 1 shows a calibration system 20, constructed according to the preferred embodiment of the present invention. A typical optical receiver 2 to be calibrated using the calibration system 20 includes a broadband photodetector 4 for converting applied optical signals into electrical signals, followed by a preamplifier 6 and an electrical spectrum analyzer (ESA) 8. The ESA measures the spectrum of the electrical signal 9 provided at the output of the preamplifier 6 and presents the measured electrical power spectrum 15 on a display 10 which may be a CRT or other type of output device. The performance of the photodetector 4, preamplifier 6, ESA 8 and other elements within the optical receiver 2 determines the transfer function H(f) of the optical receiver 2, which characterizes the conversion of applied optical signals to the electrical power spectrum 15 shown on display 10. Calibration of the optical receiver 2 includes determining its transfer function H(f) to account for the optical efficiency of the optical signal path between an input reference plane 14 and the photodetector 4, and to account for the photodetector's responsivity, the preamplifier's gain, the measurement bandwidth of the ESA 8, and other elements that effect the transfer function H(f). Once established, the transfer function H(f) is used to correct the display 10 to complete the calibration of the optical receiver 2. With the optical receiver calibrated, parameters such as optical noise figure of high bandwidth optical components can be measured using known techniques.

Calibration of the optical receiver 2 is dependent on a relative intensity noise (RIN) standard 1. The RIN standard 1 include an optical filter 5 that is illuminated by an optical noise source 3 to produce a reference optical noise signal 7 at the input reference plane 14. Amplified spontaneous emission (ASE) from a fiber optic amplifier forms the optical noise source 3 because the ASE noise power spectrum has a high power and is relatively flat over a bandwidth of approximately 40 nm, centered at approximately 1550 nm, a frequency of interest in optical communication systems. The unpolarized reference optical noise signal 7 provided by the ASE significantly reduces polarization dependent losses in the calibration system. For polarization sensitive optical receivers 2, a polarized reference optical noise signal 7 may be provided by a polarized optical noise source 3 or polarized optical filter 5 to characterize polarization dependent losses of the optical receiver 2. For a fixed average noise power level, an increase in noise power of up to 3 db may also be achieved by a polarized reference optical noise signal 7. Although the RIN standard 1 is shown to include an ASE from a fiber optic amplifier as the optical noise source 3 and an optical filter 5, the RIN standard 1 can include other means for producing the reference optical noise signal 7. For example, a coherent laser signal combined with ASE from either the gain media responsible for the laser signal or from an independent gain media, such as a fiber optic amplifier, may also provide the reference optical noise signal 7.

The optical filter 5 in the RIN standard 1 has a flat frequency response and slow aging characteristics to provide consistent operating performance. Although many types of optical filters 5 may be used, the optical filter 5 is typically realized using bulk optics, or alternatively, the optical filter 5 is implemented within a fiber, for example, using Bragg gratings. The bandwidth of the optical filter 5 is approximately 3 nm wide so that the total electrical noise power density created in the photodetector 4 is sufficiently higher than the thermal noise floor of the optical receiver 2 to provide for accurate calibration. However, the bandwidth of the optical filter 5 is not so large for a given ASE noise power spectrum as to saturate the photodetector 4 or overload other elements within the optical receiver 2. Reflections between the optical noise source 3, the optical filter 5, and the optical receiver 2 are minimized to maintain a flat power spectrum for the reference optical noise signal 7. The low coherence length of the ASE also reduces time varying fluctuations in noise power inherent in finite coherence length optical sources in the presence of optically reflective environments.

Once the optical noise source 3 and the optical filter 5 are selected, a relative intensity noise value RINx, is calculated from the optical spectral shape and average optical noise power level of the reference optical noise signal 7. The value RINx of a particular optical noise source 3 and optical filter 5 forms the RIN standard 1 that produces the reference optical noise signal 7 used to calibrate the optical receiver 2. The optical spectral shape of the reference optical noise signal 7, when referenced to the absolute power level provides an optical spectrum $S_E(f)$, which is measured as a function of optical frequency f, using an optical spectrum analyzer 13. The optical spectrum $S_E(f)$ is translated to an intensity power spectrum $S_{AP}(f)$ by first computing the autocorrelation $G_E(\tau)$ of the optical field of the reference optical noise signal 7, which can be computed according to:

$$G_E(\tau) = FT^{-1}(S_E(f)) \quad (1)$$

where $FT^{-1}$ denotes the inverse Fourier Transform and where $\tau$ is the autocorrelation translation dummy variable. The intensity power spectrum $S_{AP}(f)$, in turn, is derived from the autocorrelation $G_E(\tau)$ of the optical field as:

$$S_{AP}(f) = FT|G_E(\tau)|^2 \quad (2)$$

where FT denotes the Fourier Transform. The value RINx of the RIN standard 1 is calculated from the derived intensity power spectrum $S_{AP}(f)$ of the reference optical noise signal 7, and the average optical power <P> of the reference optical noise signal 7 computed by integrating the optical power spectrum $S_E(f)$, as:

$$RINx = S_{AP}(f)/<P>^2 \quad (3)$$

This calculated value RINx, defined by the bandwidth of the optical filter 5 for the RIN standard 1, is recorded.

An electrical noise power spectrum $S_e(f)$ of the electrical signal 9 measured by the ESA 8 is related to the intensity power spectrum $S_{AP}(f)$ of the optical noise signal 7 by the transfer function H(f) of the optical receiver 2 according to the relationship:

$$S_e(f) = S_{AP}(f)H(f)^2 \quad (4)$$

The electrical measurement bandwidth of the optical receiver 2 is established by the overall bandwidth of the photodetector 4, the preamplifier 6 and the ESA 8, which are in the microwave frequency range. The reference optical noise signal 7 may also be applied to a photodetector 4 to generate a high power and wide bandwidth electrical noise source.

Using the value RINx of the RIN standard 1 and substituting equation (3) into equation (4), the transfer function H(f) is obtained as:

$$H(f)^2 = S_e(f)/(RINx<P>^2) \quad (5)$$

The value RINx is known, the average optical power <P> is measured by an optical power meter 12 or other power measurement device, such as a calibrated optical spectrum analyzer 13, and the electrical noise power spectrum $S_e(f)$ is measured on the ESA 8. Thus, the transfer function H(f) of the optical receiver is readily determined from equation 5. Since the transfer function H(f) characterizes the conversion of optical signals by the optical receiver 2 to the electrical power spectrum 15 on the display 10, a correction array can be established in a controller 11 to adjust the display 10 at each measurement frequency according to the established transfer function H(f). Once the transfer function H(f) is determined and the display 10 is corrected, the optical receiver 2 is calibrated and ready to measure an optical component or system. Noise figure and other performance parameters of optical components are readily measured with the calibrated optical receiver 2 using known techniques. For example, a pair of measurements made by the optical receiver 2, one measurement with an optical component applied to the optical receiver 2 and one measurement without the optical component applied, are compared to characterize the optical component's noise figure.

The value RINx of the RIN standard 1 may be periodically verified to ensure the accuracy of the receiver calibration. To verify the value RINx, the reference optical noise signal 7 from the RIN standard 1 is applied to the optical power meter 12 or other power measurement device which measures average optical power <P>. Then the reference optical noise signal 7 is applied to an optical spectrum analyzer 13 which measures the optical spectrum $S_E(f)$. The power meter 12 and optical spectrum analyzer 13 may be linked to the controller 11, such as a computer or microprocessor, that is separate from or integrated into the optical receiver 2. The controller 11 records the average optical power <P> and the optical spectrum $S_E(f)$ measurements of the reference optical noise signal 7 and re-calculates the RIN from the measured values. The controller then verifies agreement of the re-calculated RIN with the value RINx of the RIN standard 1. If the re-calculated RIN is in agreement with the value RINx, the RIN standard 1 is verified. Otherwise, measurements using the optical receiver 2 may be deferred until the discrepancy between the value RINx and the re-calculated RIN is resolved.

Typically, the measurements of the average optical power $<P>$ and the electrical noise power spectrum $S_E(f)$, and the optical power spectrum $S_E(f)$ have measurement traceability to measurement standards through the National Institute of Standards Technology (NIST) or other standards organizations, based on the optical power meter 12, the ESA 8 and the optical spectrum analyzer 13 used to make the measurements. Since the value RINx is a calculation that is based on the traceable measurements, the value RINx, of the RIN standard 1 is also traceable. Thus, the transfer function H(f) also has measurement traceability, providing a valid calibration of the relative frequency response of the optical receiver 2 and a valid calibration of the absolute level of the optical receiver.

What is claimed is:

1. A calibration system for an optical receiver that converts optical signals to received signals according to a transfer function, the calibration system comprising:

an optical noise standard producing a reference optical noise signal for stimulating the optical receiver, the reference optical noise signal having a known intensity spectrum and a known average power; and a controller coupled to the optical receiver, computing the transfer function using a received spectrum from the received signal resulting when the reference optical noise signal is applied and using the known intensity spectrum and the known average power.

2. The calibration system of claim 1 wherein the transfer function is computed as the received spectrum divided by the product of the known average power squared and the ratio of the known intensity spectrum to the known average power squared.

3. The calibration system of claim 1 wherein the optical noise standard includes a coherent laser signal combined with amplified spontaneous emission to form the reference optical noise signal.

4. The calibration system of claim 1 wherein the optical noise standard includes an optical noise source and an optical filter illuminated by the optical noise source, the reference optical noise signal produced at the output of the optical filter.

5. The calibration system of claim 4 wherein the optical noise source is amplified spontaneous emission from a fiber optic amplifier.

6. The calibration system of claim 4 wherein the bandwidth of the optical noise source is greater than the bandwidth of the optical filter.

7. The calibration system of claim 6 wherein the reference optical noise signal simultaneously stimulates the optical receiver at all frequencies within the bandwidth of the optical filter.

8. The calibration system of claim 1 wherein the optical noise standard is defined according to a known ratio of the known intensity spectrum to the known average power squared.

9. The calibration system of claim 8 further comprising a spectrum analyzer coupled to the controller for measuring an optical spectrum of the reference optical noise signal and a power measurement means coupled to the controller for measuring the average power of the reference optical noise signal, the controller calculating the ratio of a measured intensity spectrum corresponding to the measured optical spectrum, to the measured average power squared, and comparing the calculated ratio to the known ratio to verify the optical noise standard.

10. The calibration system of claim 9 wherein the measured intensity spectrum is computed from the measured optical spectrum as the Fourier Transform of the magnitude squared of the Inverse Fourier Transform of the measured optical spectrum.

11. A method for calibrating an optical receiver that receives optical signals and produces received signals according to a transfer function, the method comprising the steps of:

producing a reference optical noise signal having a known relative intensity noise value;

applying the reference optical noise signal to the optical receiver;

measuring the power spectrum and the average power of the received signal;

computing the transfer function of the optical receiver from the known relative intensity noise value, the average power and the power spectrum; and correcting the received signals produced by the optical receiver according to the computed transfer function.

12. The method of claim 11 wherein the known relative intensity noise value equals the ratio of an intensity spectrum of the reference optical noise signal and an average power squared of the reference optical noise signal wherein the intensity spectrum equals the Fourier Transform of the magnitude squared of the Inverse Fourier Transform of the measured power spectrum.

13. The method of claim 11 wherein the step of producing a reference optical noise signal includes illuminating an optical filter with an optical noise source.

14. The method of claim 11 wherein the step of producing a reference optical noise signal includes summing a coherent laser signal and amplitude spontaneous emission.

15. The method of claim 11 wherein the step of producing a reference optical noise signal includes illuminating an optical filter with amplified spontaneous emission from a fiber optic amplifier.

16. The method of claim 11 wherein the step of applying the reference optical noise source includes the step of stimulating the optical receiver simultaneously at multiple frequencies.

17. The method of claim 11 further comprising the steps of blocking transmission of the reference optical noise source to the optical receiver and measuring the thermal noise of the optical receiver and wherein the step of computing the transfer function further includes subtracting the thermal noise of the optical receiver.

18. The method of claim 12 further comprising the steps of measuring the intensity spectrum and the average power of the reference optical noise signal, computing the ratio of the measured intensity spectrum and the measured average power squared, and comparing the ratio to the known relative intensity noise value to verify agreement between the computed ratio and the known relative intensity noise value.

* * * * *